INVENTOR.
Emmet D. Riggs.
BY Charles F. Steininger
ATTORNEY

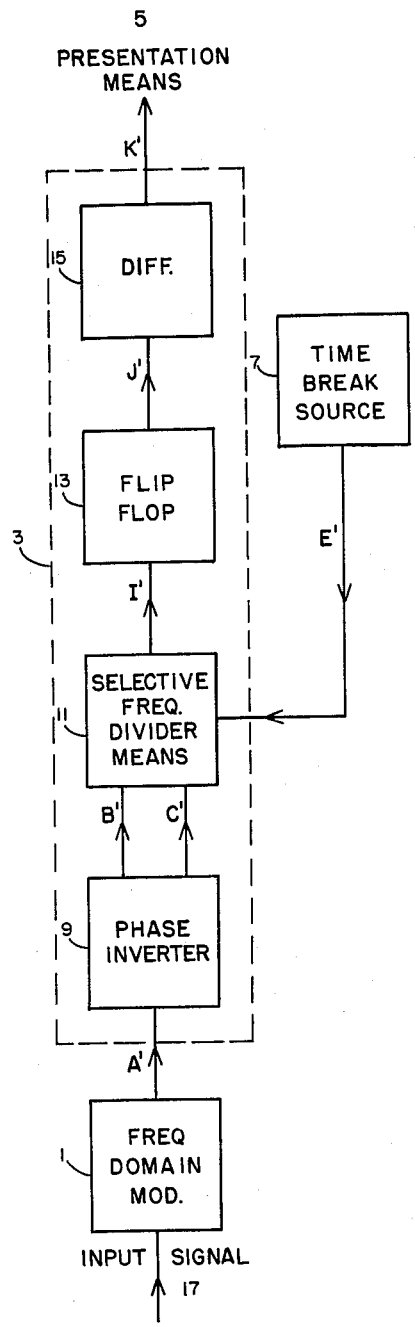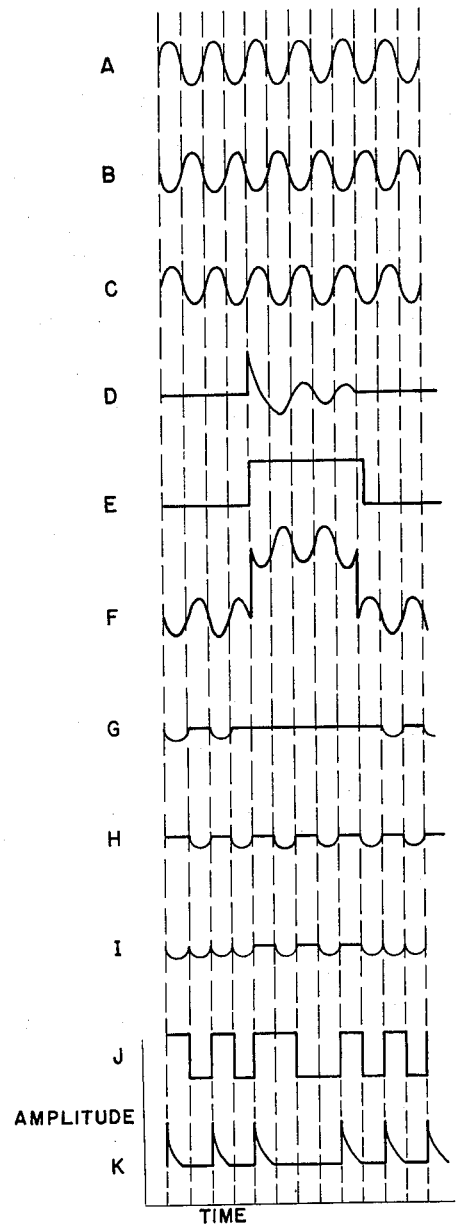

INVENTOR.
Emmet D. Riggs.
BY Charles F. Steininger
ATTORNEY

INVENTOR.
Emmet D. Riggs.
BY Charles F. Steininger
ATTORNEY

United States Patent Office 3,258,700
Patented June 28, 1966

3,258,700
METHOD AND APPARATUS FOR PRODUCING A TIME BREAK ON AN FM SIGNAL
Emmet D. Riggs, Dallas, Tex., assignor to The Atlantic Refining Company, Philadelphia, Pa., a corporation of Pennsylvania
Filed July 2, 1962, Ser. No. 206,860
18 Claims. (Cl. 328—189)

The present invention relates to an improved method and appartus for recording time breaks. More specifically, the present invention relates to an improved method and apparatus for imposing a time break on a frequency domain modulated carrier. Most specifically, the present invention relates to an improved method and apparatus for imposing a time break on a frequency modulated carrier to produce a mark of definite amplitude, polarity and duration and to a novel tone detector for indicating when the time break is to be imposed.

In seismic operations and in many other fields of endeavor where signals are telemetered and recorded for later observation, it is necessary to indicate and record, along with the primary data, a zero or reference time mark. In seismic operations, this reference time mark is commonly referred to as a time break and is designed to represent the instant at which an actuated force generates a seismic disturbance. Seismic operations employing explosives to generate the disturbance normally use the same current that detonates the explosive to develop the time break signal and this signal is normally sent over a wireline to a recorder. In weight dropping operations, a fairly recent development in seismic operations, the problem of accurately recording the time break is complicated by several factors not faced in conventional seismic operations. For example, the weight impact generates the seismic disturbance instead of the conventional electrically actuated explosive and the fall time preceding the impact varies considerably throughout a weight drop traverse. Other related complicating factors will be described hereinafter.

Today it is a fairly common practice in weight dropping operations to employ a system using a radio communications link between the weight drop truck and the recording truck and tone signals to release the weight and to indicate the time of impact. Although this general system is the most satisfactory one developed to date, it has several serious drawbacks which impede satisfactory operations in some cases and prevent satisfactory operations in other cases. For instance, with this system conventional seismic time breaks are often distorted or lost in background noise. The high background noise which is normally associated with seismic operations and the additional noise created by the weight drop machinery and the weight truck traversing the area of interest combine to create background noise that can partially or completely hide the presence of the time break on the recorded trace. Even when the conventional time break is only partially hidden it is very difficult to accurately locate its starting point due to the overriding noise. Of course, in weight dropping operations this problem is especially serious since the exact location of the time break on a record is essential. Its essentialness can be appreciated when it is remembered that a single weight drop produces an extremely weak signal and that in most instances from 50 to over 100 signals recorded as individual traces must be added to produce the usable summation trace. Before the weak individual signals can be added they must be lined up from a common reference point so that corresponding significant reflections on individual traces will not act to cancel each other and thus distort or destroy the intelligence on the final trace. When the time break on one or more of the individual traces cannot be accurately located the subject traces must be re-run (usually with no better success), discarded, or the locations approximated with the hope that intelligence in the summation trace is not too adversely affected.

It is therefore an object of the present invention to provide an improved method and apparatus for indicating time breaks.

Another object of the present invention is to provide an improved method and apparatus for indicating time breaks in seismic operations.

Another object of the present invention is to provide an improved method and apparatus for indicating time breaks with a high degree of accuracy.

Another object of the present invention is to provide an improved method and apparatus for indicating time breaks in frequency domain modulated communication systems.

Another object of the present invention is to provide an improved method and apparatus for indicating time breaks in frequency modulated radio communication systems.

Another object of the present invention is to provide an improved method and apparatus for imposing a time break of definite amplitude, polarity and duration on a frequency domain modulated carrier.

Another object of the present invention is to provide a novel tone detector.

Another object of the present invention is to provide a highly selective tone detector capable of providing a signal only on cessation of a tone of predetermined frequency.

Another object of the present invention is to provide an improved method and apparatus for accurately indicating time breaks in weight dropping operations wherein tone cessation indicates drop time and frequency modulated radio communication is utilized to transmit data.

These and other objects of the present invention will be apparent from the following detailed description used in conjunction with the accompanying drawings, wherein:

FIGURE 2 illustrates a block diagram of a preferred device capable of practicing the invention.

FIGURE 3 shows simplified waveforms developed by components in FIGURE 2.

Basically, the invention encompasses methods and apparatus for accurately imposing a time break of predetermined amplitude, polarity and duration on a frequency domain modulated signal by drastically altering the modulation, in a predetermined manner, during the period of the time break. For purposes of this invention the term frequency domain modulation is intended to cover all types of signal modulation in the frequency domain, i.e., pulse time modulation, phase modulation, frequency modulation, etc. The modulation is altered in a manner to insure that, after signal demodulation, the time break stands out clearly regardless of the amount of background noise. In addition, the modulation is altered so that the time break always maintains a predetermined amplitude, polarity and duration. This, of course, prevents distortion and movement of the time break when a plurality of signals is added such as in weight dropping operations. In most conventional seismic amplifying circuits large noise transients can change frequency modulation up to approximately 20 percent of the carrier frequency. Therefore, to insure that the time break always rises above the noise level, according to the invention the time break should change the carrier frequency by at least 25 percent and preferably by 50 percent.

Figure 1:
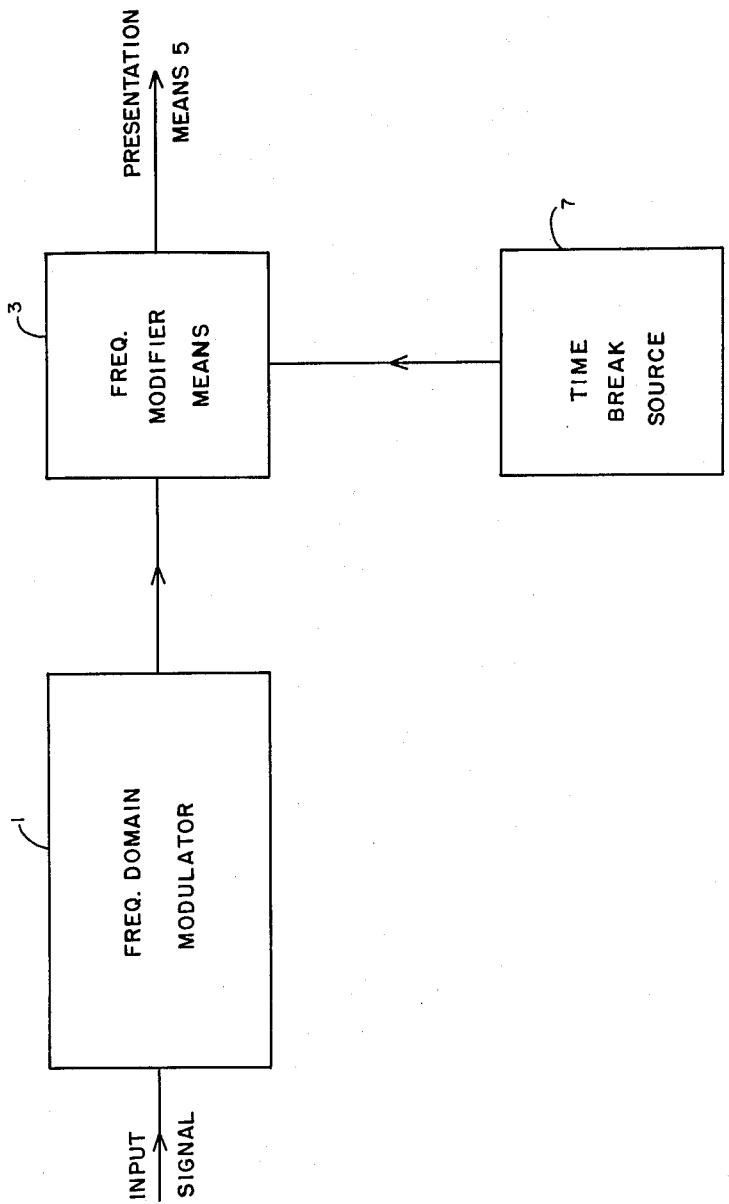
FIGURE 1 illustrates a block diagram of a device capable of practicing the basic invention.

FIGURE 1 shows a block diagram of one device capable of practicing the basic invention. Frequency domain modulator 1 is connected to frequency modifier means 3 which in turn is connected to presentation means 5. Time break source 7 is connected to frequency modifier means 3. Presentation means 5 can be any suitable device such as an oscilloscope or recorder means adapted to receive the frequency modulated signal and present it in modulated or demodulated form. The frequency domain modulator can be any type of modulator as defined above. Frequency modifier means 3 can be any type of selective frequency divider or multplier that can be made to operate on a frequency domain modulated signal during a predetermined period. Time break source 7 can be any type of actuating system that can be used to cause 3 to operate during a predetermined period.

Although various methods can be used to practice the basic invention, the preferred method of imposing a time break on a frequency domain modulated signal comprises the steps of, (a) Frequency domain modulating a carrier wave with a signal of interest to produce a first frequency domain modulated signal, (b) Dividing the first frequency domain modulated signal into X number of frequency domain modulated signals whereby each of said divided signals is $360/X$ degrees out of phase with the remaining number of said divided signals, (c) Suppressing at least one of the divided signals during a portion of the time said carrier is modulated to produce at least one modified divided signal, (d) Adding the modified and unmodified divided signals to produce a totalized frequency domain modulated signal, and (e) Dividing said totalized frequency domain modulated signal by X to produce the first frequency modulated signal except for the period of the time break when the frequency is drastically altered.

FIGURE 2 illustrates in block form one device capable of practicing the preferred method of imposing time breaks on a frequency domain modulated signal. The device as shown includes frequency modulator 1 serially connected to phase inverter 9, selective frequency divider means 11, flip-flop 13 and differentiating circuit 15. Time break source 7 is connected to frequency divider means 11. Phase inverter 9 is connected in parallel to frequency divider means 11. Input signal 17 is shown entering modulator 1 and presentation device 5 is shown connected to differentiating circuit 15. Signal 17 represents a seismic or other suitable signal and is processed according to the invention by circuitry components 1 through 15 after which it is presented by 5. As in FIGURE 1, 5 is not part of the invention and can be any type of circuit suited to present the signal in modulated or demodulated form, visually or otherwise. Regardless of what is used as presentation circuit 5, time break source 7 represents any suitable component for producing a biasing signal of predetermined amplitude and width at a predetermined period.

The operation of the device shown in FIGURE 2 can best be described by referring to waveforms illustrated in FIGURE 3. For purposes of simplicity, the waveforms have been simplified and in some cases exaggerated. For ease of explanation, input signal 17 which normally frequency modulates the carrier wave will not be considered and only the carrier wave modifications will be discussed as we refer to FIGURES 2 and 3. If the carrier frequency of modulator 1 is 2,500 c.p.s., waveform A will appear at A' as a 2,500 c.p.s. carrier (no-signal condition). Phase inverter 9 operates on carrier A to produce signal B at B' and signal C at C' where C is 180 degrees out of phase with B. Waveform D produced from within or without component 7, as will be described hereinafter, causes 7 to produce waveform E, of a predetermined width and amplitude, so that it appears at E'. Selective frequency divider circuit means 11 adds E to either B or C, in this case B, producing waveform F. Waveforms F and C are simultaneously half-wave rectified to produce waveforms G and H and added to produce waveform I at I'. I operates flip-flop 13 to produce waveform J at J', it being noted that J is one-half the frequency of I. J is differentiated by differentiating circuit 15 to produce waveform K at K'. In examining the over-all operation, it should be noted that the biasing amplitude of the pulse in waveform E was chosen to suppress one of the waveforms during the time break. Of course, other amplitudes and frequency changes can be utilized so long as there is significant variation in frequency which will appear above the background noise when waveform K is detected.

If it is desirable to divide the modulated carrier into more than two divided signals phase inverter 9 can be modified and additions made thereto to produce X number of divided signals, each signal $360/X$ degrees out of phase with each of the remaining divided signals. This modification can be made in a conventional manner well known to those skilled in the art. Regardless of the number of signals in which the carrier is divided it is preferable to limit suppression from 1 to $X-1$ divided signals. If X divided signals are suppressed, random noise in the circuit may trigger stages following the suppression stage. A typical suppression stage is described in detail in the discussion of FIGURE 4.

When it is desirable to indicate the time break by drastically increasing the frequency instead of reducing it, selective frequency divider means 11, FIGURE 2, is change to a selective multiplier means and flip-flop 7 is omitted. The selective frequency multiplier means can be any type of conventional frequency multiplier circuit which can be operated during a predetermined period to increase the frequency of the carrier wave by a predetermined ratio. One of the simplest device includes a phase inverter 9 and selective frequency divider means 11, FIGURE 2, modified so that suppression is applied to all but one of the divided signals during the absence of the time break. This modification produces the frequency increase during the period of the time break.

When it is desirable to operate on a pulse duration modulated signal, frequency modifier means 3, FIGURE 2, is changed as follows: Phase inverter 9 is replaced by two amplifier stages, operating in parallel, one of which is preceded by a delay stage adapted to produce a phase delay of 180 degrees at the carrier frequency. The two outputs from the two amplifier stages produce separate pulse trains 180 degrees out of phase. Flip-flop 13 is omitted. In operation, the delayed pulse train is suppressed by a signal from 7 except during the presence of the time break pulse.

If a pulse position modulated signal is operated on it is preferable to change the modulation from pulse position to pulse duration and operate on same as described above. See pages 287 to 288 and 264 to 266 of Modulation Theory, by Harold S. Black, copyrighted 1953, for devices capable of producing the change in modulation.

In either pulse duration or pulse position modulation the frequency of the time break can be increased or decreased within the 25 to 50 percent range discussed heretofore. The manner of increasing or decreasing the frequency is accomplished by varying the number of signals produced from the carrier, with appropriate phase shifts, as described in the discussion of frequency modulation.

Figure 4:
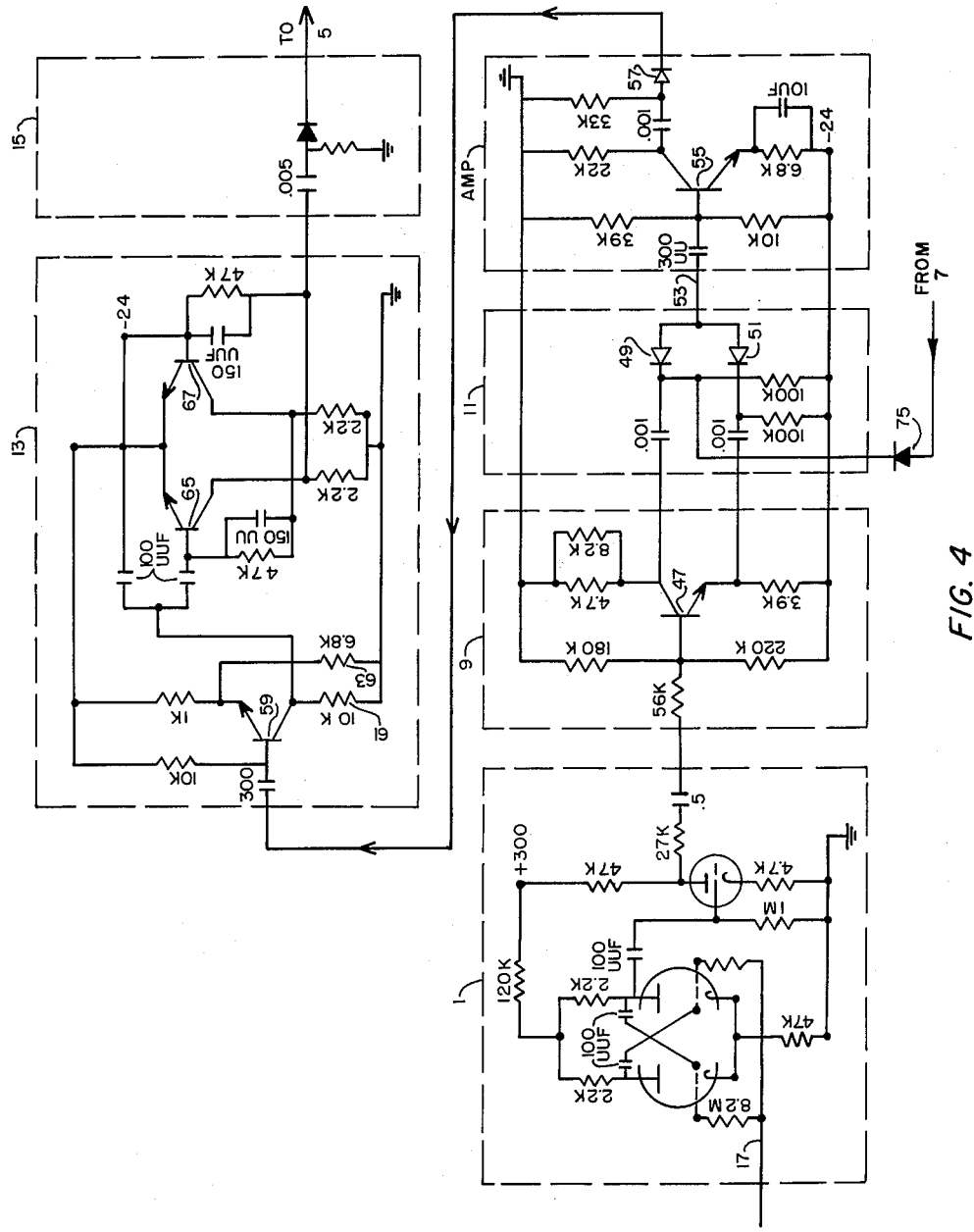
FIGURE 4 shows a circuit diagram of the preferred embodiment of a portion of the over-all invention.
Figure 5:
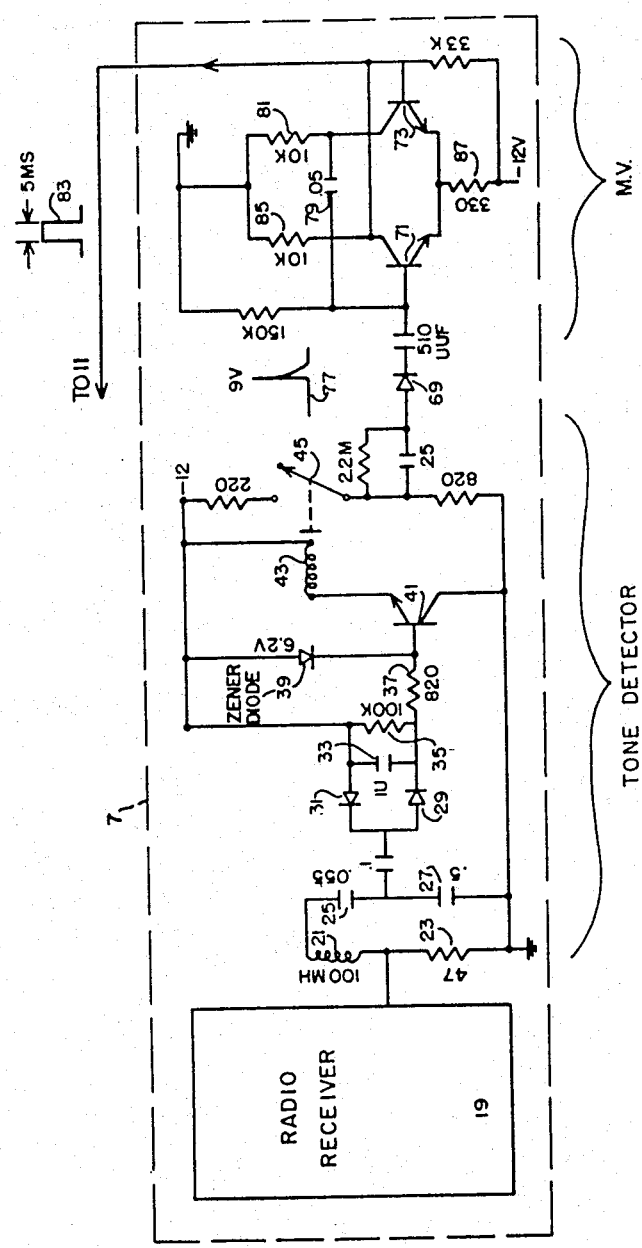
FIGURE 5 shows a circuit diagram of the preferred embodiment of the tone detector and its associated circuitry.

For a detailed operation of the preferred apparatus for practicing the preferred method, refer now to FIGURE 4 showing a device capable of imposing time breaks on a frequency modulated carrier and to FIGURE 5 showing the preferred embodiment of a device for developing the appropriate signal during the period the time break is to be imposed on the frequency modulated signal.

Before discussing the over-all invention as shown in FIGURES 4 and 5, let us refer specifically to the tone detector shown in FIGURE 5. This novel detector is highly suited to weight dropping techniques where tone cessations are used to release the weight from the weight truck and to indicate when the weight strikes the ground. Although the detector can also be utilized with various other systems using tone cessation as a signaling means, for purposes of explanation, the detector is shown in FIGURE 5 as part of a system for indicating time breaks. The tone detector is shown connected between radio receiver 19 and the unistable multivibrator. Examining the detector in detail, coil 21, resistor 23 and capacitors 25 and 27 make up a tuned circuit. The values of the components in the circuit are computed to make it highly selective so that it rejects transients and only receives the tone signal of interest. In the preferred embodiment, a tone of 2,400 c.p.s. is utilized and the values of the components as shown tune the circuit to this frequency. Diodes 29 and 31 are used as rectifiers and capacitor 33 and resistors 35 and 37 are used as the rectifier filter. Zener diode 39 determines the level to which transistor 41 is driven by the received tone. Relay 43 is a high-speed, reed-type relay that operates switch 45 within less than 1 millisecond. When the 2,400 c.p.s. tone is received a voltage is developed across capacitor 27 and full wave rectified by diodes 29 and 31. The rectified voltage charges capacitor 33 so that the base of transistor 41 is driven in a positive direction and conducts. The range of the voltage on the base of transistor 41 is limited by series resistor 37 and Zener diode 39 so that its operation point is indepedent of the tone signal amplitude from the radio receiver.

The complete operation of the detector as well as the remaining components in time break source 7, FIGURE 5, is described in detail in conjunction with the circuit shown in FIGURE 4.

In FIGURE 4, dashed blocks 1, 9, 11, 13 and 15 indicate generic components shown in FIGURE 2. The preferred embodiment of each component is shown by a circuit diagram inside each block. Modulator 1 is illustrated as a conventional frequency modulator, the output of which is connected to the base of transistor 47 in phase inverter circuit 9. Outputs are taken from both the emitter and the follower of transistor 47 and connected respectively to diodes 49 and 51 in frequency divider means 11. The outputs of diodes 49 and 51 are connected in parallel through conductor 53 to the base of transistor 55 in the amplifier circuit. Although the optional amplifier circuit is not shown in FIGURE 2, the preferred embodiment utilizes the amplifier circuit as shown to isolate the multivibrator and to provide an efficient coupling means between 11 and 13. The output of transistor 55 is connected through diode 57 to the base of transistor 59. Transistor 59 combines with resistors 61 and 63 to form the driver or coupling portion of flip-flop circuit 13. The driver portion of the circuit is utilized to furnish a reliable means of triggering 13. The output of the driver is taken from the collector of transistor 59 and applied in parallel to the bases of transistors 65 and 67 making up the flip-flop circuit as shown. The output of the flip-flop circuit is sent through differentiating circuit 15 and on to the presentation device 5.

The time break source 7, FIGURE 2, of the preferred embodiment is shown in FIGURE 5. A conventional FM receiver 19 is connected to the previously described tone detector. The output of the tone detector is connected through diode 69 to the bases of transistors 71 and 73. Transistors 71 and 73 combine with associated circuitry to form the one shot multivibrator as shown. The output from the multivibrator is connected through diode 75 to the cathode of diode 49 in frequency divider means 11, FIGURE 4.

For purposes of illustrating the detailed operation of the device as shown in FIGURES 4 and 5, let us assume that the device is part of a system housed in a recording truck engaged in weight dropping operations. Consider, first, the circuitry in FIGURE 4. A 2400-cycle tone signal is generated as the weight is released from the weight truck. Input or seismic signal 17 from the seismometers, not shown, initially contains random noise only. As a matter of interest, it should be remember that it is conventional in seismic operations to use a D.C. amplifier preceding the frequency modulator to set the center frequency of the modulator and that the amplifier is compensated by conventional feedback methods to obtain linearity of a plus or minus one-half percent over the frequency range used. However, since neither the D.C. amplifier nor the compensating component is a part of the invention they are not shown in FIGURE 4. The carrier frequency modulated by input signal 17 passes from modulator 1 to the base of transistor 47 in phase inverter 9. Concurrently with this operation, the 2400-cycle tone, described above, is continuously received by radio receiver 19 and detected by the tone detector, FIGURE 5. When the 2400 c.p.s. tone is initially received capacitor 33 changes, transistor 41 conducts energizing relay 43 as described heretofore. When the relay closes switch 45 initially, a negative going pulse is generated but rejected by diode 69. Concurrently with this operation, the frequency modulated signal from modulator 1, FIGURE 4, is applied to the base of transistor 47 and is divided into two signals 180 degrees out of phase. The signal from the emitter is applied to diode 51 and the signal from the collector is applied to diode 49, both diodes located within frequency divider means 11. The respective diodes half-wave rectify the two signals thereafter adding the signals and transmitting the summed signal to the base of transistor 55 in the amplifier circuit. The output is taken from the collector of transistor 55 after which diode 57 removes the negative overshoot. The summed signal is then sent to the base of transistor 59 in the driver stage of flip-flop circuit 13. The amplified signal from the collector of transistor 59 is used to trigger flip-flop circuit 13. The square wave signal produced by the flip-flop action is differentiated by differentiating circuit 15 and sent to the presentation means 5. When the weight strikes the ground an impact switch on the weight, not shown, terminates the 2400 c.p.s. tone signal. At cessation of tone, the capacitor 33, FIGURE 5, discharges through resistor 35 and transistor 41 ceases conduction, de-energizing 43 and opening switch 45. The opening of the switch produces a positive going 9 volt pulse 77 is passed through diode 69 to trigger the one shot multivibrator. At this point, it should be noted that while the closing time of relay 45 may vary, depending upon the amplitude of the received tone, the opening time is always precise since the operating point is fixed by the characteristics of the Zener reference diode 39. Trigger pulse 77 is coupled to the base of transistors 71 and 73 in the multivibrator circuit. Diode 69 prevents the negative portion of the pulse from reaching the multivibrator stage. The values of capacitor 79 and resistor 81 are selected to insure that the width of pulse 83 produced by the multivibrator circuit is of proper length to produce the desired time break width. Resistors 85 and 87 of the multivibrator circuit are selected to produce the desired pulse amplitude. The component values, as shown, produce a pulse of 5 milliseconds in the preferred embodiment. Pulse 83 is applied through diode 75 to the cathode of diode 49 in frequency divider 11, FIGURE 4, and biases the diode to cut-off. During cut-off only the signal from the emitter of transistor 47 is passed by conductor 53. This signal is half-wave rectified by diode 51. The half-wave output is treated by the remaining portion of the circuit in the same manner as described heretofore. With the passing of suppression pulse 83, diode 49 again conducts so that the voltage at conductor 53 is the summation of two half-wave rectified signals which is shown as waveform I in FIGURE 3.

From the discussion of the circuit operation above and from the illustrative waveform shown in FIGURE 3 it is clear that regardless of background noise applicant's novel method accurately produces a clear time break of a predetermined amplitude, polarity and duration by producing a severe frequency change. In the preferred embodiment described above, the carrier frequency is divided by 2 to produce a severe change in frequency amounting to 50 percent of the carrier frequency at the moment of imposition. By producing the severe change at the desired moment the time break always appears above the background noise with a characteristic polarity and shape that insures the exact location of the time break.

Having thus described the invention, it is to be understood that such description has been given by way of illustration and example only and not in the way of limitation, reference for the latter purpose being had to the appended claims.

I claim:

1. In a method of accurately imposing a time break of predetermined amplitude, polarity and duration on a frequency domain modulated signal of interest comprising the steps of,
    (a) frequency domain modulating a carrier wave with the signal of interest to produce a first frequency domain modulated signal,
    (b) dividing said first frequency domain modulated signal into X number of frequency domain modulated signals whereby each of said divided signals is 360/X degrees out of phase with the remaining number of said divided signals,
    (c) suppressing at least one of said divided signals during a portion of the time said carrier wave is modulated to produce at least one modified divided signal,
    (d) adding said modified and unmodified divided signals to produce a totalized frequency domain modulated signal, and
    (e) dividing said totalized frequency domain modulated signal by X to reproduce said first frequency domain modulated signal except for the period of said time break when said frequency is drastically altered.

2. In a method as set forth in claim 1 wherein the frequency domain modulation is frequency modulation.

3. In a method as set forth in claim 1 wherein the X number is two.

4. In a method as set forth in claim 1 wherein the X number is four.

5. In a method as set forth in claim 1 wherein at least one of the divided signals is suppressed during the period the time break appears.

6. In a method as set forth in claim 1 wherein at least one of the divided signals is suppressed during the period the time break is absent.

7. In a method of accurately imposing a time break of predetermined amplitude, polarity and duration on a frequency modulated signal of interest comprising the steps of,
    (a) frequency modulating a carrier wave with the signal of interest,
    (b) dividing the frequency modulated carrier into first and second divided signals, said second divided signal 180 degrees out of phase with said first divided signal,
    (c) developing a suppressing pulse of predetermined width at the time the time break is to appear on said signal of interest,
    (d) adding said suppressing pulse to one of the divided signals to produce a modified divided signal,
    (e) half-wave rectifying said modified and unmodified divided signals,
    (f) adding said half-wave rectified modified and unmodified divided signals to produce a frequency varying third signal,
    (g) producing a square wave signal whose frequency is one-half the frequency of said third signal, and
    (h) differentiating said square wave signal whereby marked frequency variation caused by the addition of said suppressing pulse produces a characteristic frequency change identifiable as said time break.

8. An apparatus for imposing a time break fo predetermined amplitude, polarity, and duration on a frequency domain modulated signal of interest comprising,
    (a) a frequency domain modulator,
    (b) a phase inverter connected to said frequency domain modulator,
    (c) a selective frequency divider means connected in parallel to said phase inverter,
    (d) a flip-flop connected to said selective frequency divider means,
    (e) a differentiating circuit connected to said flip-flop, and
    (f) a time break source connected to said frequency divider means.

9. In an apparatus as set forth in claim 8 wherein the time break source includes a tone detector connected to a multivibrator means.

10. In an apparatus as set forth in claim 8 wherein the frequency divider means includes a first and second rectifying means connected in parallel and one of said rectifying means is connected to the time break source.

11. In an apparatus as set forth in claim 9 wherein the tone detector comprises a tuned circuit, a rectifying means connected to said tuned circuit, and a switch means connected to said rectifying means.

12. In an apparatus as set forth in claim 8, wherein the frequency domain modulator is a frequency modulator.

13. In an apparatus as set forth in claim 8, wherein the phase inverter includes a transistor with its base connected to the frequency domain modulator.

14. In an apparatus as set forth in claim 8, wherein an amplification stage is connected between the frequency divider and the flip-flop.

15. A tone detector adapted to accurately indicate tone cessation comprising,
    (a) a tuned circuit,
    (b) a full wave rectifier connected to the output of said tuned circuit,
    (c) a transistor which functions as an amplifier connected to the output of said rectifier,
    (d) a regulating means connected to said transistor, and
    (e) a relay operated switch connected to the output of said transistor.

16. In an apparatus as set forth in claim 15, wherein the tuned circuit includes at least two capacitors connected in series.

17. In an apparatus as set forth in claim 15, wherein a filter circuit is connected between the rectifier and the transistor.

18. In an apparatus as set forth in claim 15, wherein the regulating means includes a Zener diode.

References Cited by the Examiner

UNITED STATES PATENTS

| | | | |
|---|---|---|---|
| 2,533,887 | 12/1950 | Hulst | 328—189 |
| 2,764,753 | 9/1956 | Martin | 340—253 |
| 2,918,667 | 12/1959 | Olson et al. | 340—253 |
| 2,937,339 | 5/1960 | Michels | 328—189 |
| 3,015,042 | 12/1961 | Pinckaers | 307—88.5 |
| 3,044,042 | 7/1962 | Erath et al. | 328—189 X |
| 3,060,329 | 10/1962 | Harrison et al. | 307—88.5 |
| 3,069,558 | 12/1962 | Burt et al. | 307—88.5 |
| 3,131,258 | 4/1964 | O'Neill. | |

ROY LAKE, *Primary Examiner.*

ALFRED L. BRODY, *Examiner.*